United States Patent [19]

Shamblin et al.

[11] Patent Number: 5,676,358
[45] Date of Patent: Oct. 14, 1997

[54] VARIABLE HEIGHT JIG STOP ASSEMBLY AND ALIGNMENT PLATES FOR TRUSS TABLE

[75] Inventors: Wayne A. Shamblin, Fort Worth; Michael C. Rosser, Roanoke, both of Tex.

[73] Assignee: Alpine Engineered Products, Inc., Pompano Beach, Fla.

[21] Appl. No.: 552,090

[22] Filed: Nov. 2, 1995

[51] Int. Cl.$^6$ .................................................. B25B 1/20
[52] U.S. Cl. ............................. 269/37; 269/910; 29/281.3
[58] Field of Search ........................... 269/40, 37, 43, 269/303, 304, 910; 100/913; 29/281.3, 281.5; 227/152, 154, 155

[56] References Cited

U.S. PATENT DOCUMENTS

| | | | |
|---|---|---|---|
| 2,810,186 | 10/1957 | Honza | 269/910 |
| 3,036,609 | 5/1962 | Quesenberry | 269/910 |
| 4,943,038 | 7/1990 | Harnden . | |
| 5,085,414 | 2/1992 | Weaver . | |

*Primary Examiner*—Robert C. Watson
*Attorney, Agent, or Firm*—Crutsinger & Booth

[57] ABSTRACT

An improved table for use in a truss assembly apparatus is provided. The improved table includes a frame supporting a plurality of panels that define a work surface. According to a first aspect, the plurality of panels are separated by at least one opening extending across the table. Mountings are provided for rotationally mounting a lead screw across the table along the opening between the panels. At least one jig stop carrier is threadedly coupled to the lead screw and movable along the lead screw in the opening between the panels across the table in response to rotation of the lead screw. A jig stop is connected to the jig stop carrier and to project above the work surface of the table. To vertically adjust the height of the jig stop mounted to the jig stop carrier, which is coupled to the lead screw, at least one threaded shank is fixed on each of the mountings. The threaded shank extends through an aperture in the frame of the table to selectively position the mountings on the frame. At least one threaded fastener is provided on each of the threaded shanks for securing the threaded shank to the frame at a selected position along the shank, whereby the mountings are releasably secured at a selected height so that the jig stops are operably associated with the work surface defined by the panels and to accommodate different thicknesses of panels. According to another aspect, adjustable metal end plates are provided to provide an easier baseline alignment for truss construction.

11 Claims, 5 Drawing Sheets

VARIABLE HEIGHT JIG STOP ASSEMBLY AND ALIGNMENT PLATES FOR TRUSS TABLE

TECHNICAL FIELD

The invention relates to improved apparatus for assembling wood structures. More particularly, the invention relates to improved apparatus for assembling wood trusses for the building trade.

BACKGROUND OF THE INVENTION

Prefabricated wood trusses have made modern construction of buildings faster and more efficient. The wood trusses are assembled in factories equipped with machinery for mass-fabricating the individual truss components, which are assembled on large assembly tables. The completed trusses are then shipped to the construction site ready for use in the building.

The specifications for the truss designs can be practically limitless. Thus, the set up time to change the jig stops of the truss assembly apparatus from one truss design to another becomes a critical limiting factor in the manufacturing process.

A good type of truss assembly apparatus is described in U.S. Pat. No. 4,943,038 issued Jul. 24, 1990 to Alpine Engineering Products, Inc., the specification of which is incorporated herein by reference in its entirety. U.S. Pat. No. 4,943,038 describes a truss assembly apparatus with a table composed of several similar table sections, each having a plurality of table panels. The table sections are aligned and spaced apart by elongated openings and the table panels in each section are separated by narrower elongated openings between the panels of each section of the assembly table. Jig stops are provided that are individually adjustable along these openings by adjustable jig stop assemblies. Each adjustable jig stop assembly has a lead screw driven by a power-operated device, preferably a stepper motor but alternatively a power operated drill, either electric or pneumatic, or a manual hand crank. Each lead screw is rotated a predetermined amount to position its jig stop at a predetermined location across the assembly table in accordance with a specified truss design. A counter can be connected to monitor the position of each jig stop and the operator stops the corresponding lead screw when the jig stop is at the correct position specified in accordance with the truss design.

From time to time, however, the table panels of the table sections must be replaced with new material. It has been found that the changing of the table panels sometimes presents a problem because the new panels may be of a different thickness than the old panels.

It can also be a frustrating chore to align the table sections of the truss assembly apparatus. For example, to form a base line for building a truss, the adjustable jig stop assemblies of the table sections must be carefully aligned. This has in the past required time consuming and frustrating work in repositioning and adjusting the relative positions of the several table sections.

SUMMARY OF THE INVENTION

According to the invention, an improved table for use in a truss assembly apparatus is provided. The improved table includes a frame supporting a plurality of panels that define a work surface. The plurality of panels are separated by at least one opening extending across the width of the table. Mountings are provided for rotationally mounting a lead screw across the width of the table along the opening between the panels. At least one jig stop carrier is threadedly coupled to the lead screw and movable along the lead screw in the opening between the panels across the width of table in response to rotation of the lead screw. A jig stop is connected to the jig stop carrier and projects above the work surface of the table. To vertically adjust the height of the jig stop mounted to the jig stop carrier, which is coupled to the lead screw, at least one threaded shank is fixed on each of the mountings. The threaded shank extends through an aperture in the frame of the table to selectively position the mountings on the frame. At least one threaded fastener is provided on each of the threaded shanks for securing the threaded shank to the frame at a selected position along the shank, whereby the mountings are releasably secured at a selected height so that the jig stops are operably associated with the work surface defined by the panels and to accommodate different thicknesses of panels that may be used on the table.

According to another aspect of the invention, an improved table for use in a truss assembly apparatus is provided. The improved table includes a frame and a plurality of removable table panels on the frame in succession along the table forming a work surface. The table also includes a plurality of removable end plates, each end plate corresponding to one end of one of the removable table panels and shaped to abut the removable table panel. Each end plate has a plurality of jig bores therein for removably attaching jig stops and also has at least one plate :bore therein for removably attaching the plate to the frame. A plurality of pairs of spacing structures are provided that are rigidly attached to the frame, each pair of spacing structures defining a slot therebetween. And a plurality of fasteners are provided for removably attaching and positioning the end plates on the pairs of spacing structures, whereby the position of the end plates can be independently adjusted on the frame.

According to a most preferred embodiment of the invention, the vertical adjustable means for mounting the lead screw, carrier, and jig stop assembly is operatively combined with the use of adjustable end plates to provide a table section for a truss assembly that is much easier to change the set-up position from one truss design to another.

Thus, it is an object of the present invention to provide an improved table section for a truss assembly apparatus, wherein the height of the adjustable jig stop assemblies can be varied to accommodate the particular thickness of the table panels used on the table sections. It is another object of the present invention to provide an improved table section for a truss assembly apparatus wherein the end plates are removable and independently adjustable on the table section, whereby the position of the end plates can be adjusted to facilitate creating a baseline for the truss assembly.

BRIEF DESCRIPTION OF THE DRAWINGS

The accompanying drawings are incorporated into and form a part of the specification to provide illustrative examples of the present invention. These drawings together with the description serve to explain the principles of the invention. The drawings are only for purposes of illustrating preferred and alternate embodiments of how the invention can be made and used and are not to be construed as limiting the invention to only the illustrated and described examples. Various advantages and features of the present invention will be apparent from a consideration of the accompanying drawings in which.

DETAILED DESCRIPTION OF A PREFERRED EMBODIMENT

Figure 1:
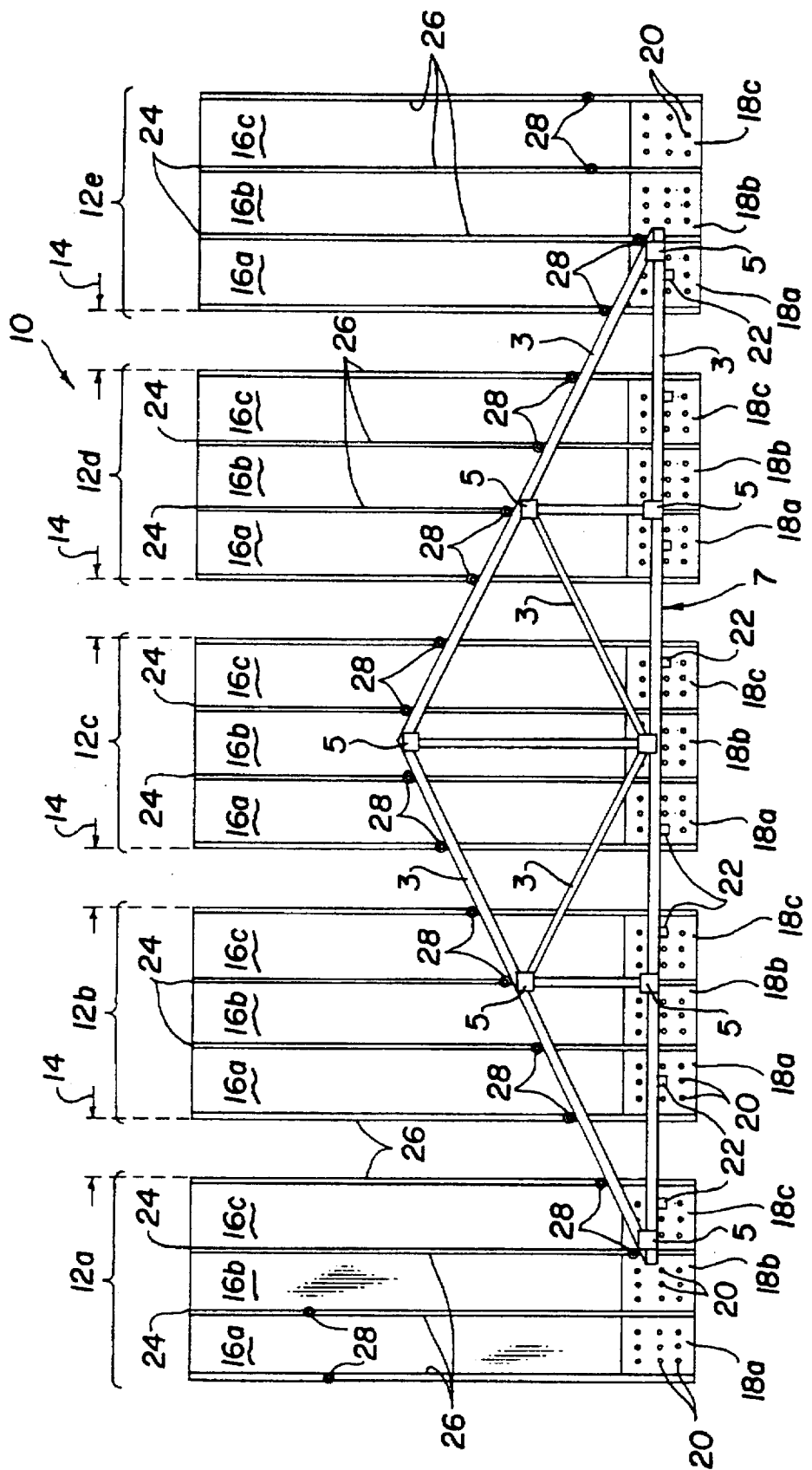
FIG. 1 is a top plan view of the truss assembly apparatus having a plurality of table sections.

The present invention will be described by referring to drawings of examples of how the invention can be made and used. Like reference characters are used throughout the several figures of the drawing to indicate like or corresponding parts.

Referring now to FIG. 1, one example of a truss assembly apparatus 10 is shown. The apparatus 10 is of a type utilized to assemble a plurality of wooden beams 3 with metal connector plates 5 to form a truss 7. The apparatus 10 is shown with five separate table sections identified as 12a through 12e, respectively. However, it is to be understood that additional or fewer table sections can be used in the apparatus 10. The table sections 12a–12e are positioned in parallel alignment and preferably separated by walkway spaces 14.

As will hereinafter be described in more detail, each of the table sections 12a–12e have rigid support frames (not shown in FIG. 1) that support a plurality of flat horizontal panels identified by reference numerals 16a, 16b, and 16c, respectively. It is to be understood, of course, that additional or fewer panels can be used on each of the table sections 12a–12e, and that the number and size of the panels is not critical to the practice of the present invention. Each of the panels 16a, 16b, and 16c has an upper, planar surface. The upper surfaces of the panels 16a, 16b, and 16c of the table sections 12a–12e define a horizontal work surface across the apparatus 10 on which a truss 7 can be assembled. Each of the panels 16a, 16b, and 16c are removably attached by bolts or other suitable fasteners to the frame of the table so that they can be replaced and changed as desired. Preferably the panels 16a, 16b, and 16c are made of a penetrable material such as wood so that temporary guides or jigging (not shown) can be nailed in place on the panels as desired which is well known in the industry.

As is also known in the industry, each of the panels 16a, 16b, and 16c of a table section can each have an abutting end portion thereof formed of metallic plate which are identified in the drawings as 18a, 18b, and 18c, respectively. The plates 18a, 18b, and 18c are bolted to the frame as hereinafter described in more detail and each is provided with a plurality of jig bores 20 for attachment of jig stops 22 in this area of the table. The jig bores 20 are formed in each of the plates 18a, 18b, and 18c in a predetermined pattern or an array and it is desirable that these jig bores 20 be prealigned across the length of the truss assembly apparatus 10, which spans the table sections 12a–12e. For example, in the embodiment shown in FIG. 1, a baseline for the lower part of the truss 7 can be established by bolting or otherwise securing a plurality of jig stops 22 to the plates 18a, 18b, and 18c using the aligned jig bores 20 across the length of the apparatus 10.

As is shown in FIG. 1, each of the horizontal panels 16a, 16b, and 16c on a particular table section 12a–12e are separated one from the other by a narrow opening 24 that extends the width of the tables. A laterally adjustable jig stop assembly 26 is located in each of the openings 24 between the panels 16a, 16b, and 16c. Similarly, a laterally adjustable jig stop assembly 26 is located along the exposed edge of each panel 16a of each of the table sections 12a–12e, and a laterally adjustable jig stop assembly is located along the exposed edge of each panel 16c of each of the table sections as shown in FIG. 1. When properly adjusted, the plurality of these jig stop assemblies 26 position jig stops 28, which can be used in the alignment and layout of the beams 3 making up a desired configuration for a truss 7.

When the apparatus of FIG. 1 is first installed, the table sections 12a–12e are placed in alignment and are leveled so that the upper surfaces of panels 16a, 16b, and 16c and the upper surfaces of pates 18a, 18b, and 18c of each of the tables 12a–12e form a planar work surface across the entirety of the apparatus 10.

The truss assembly apparatus 10 is illustrated in FIG. 1 for clarity without the peripheral equipment utilized in the truss assembly process such as gantry cranes, presses, or layout equipment as is well known in the industry. It is to be appreciated that the present invention has application to truss table assemblies whether or not the connector plates 5 are set by hand or by power assist means such as roller presses, clamps, or the like.

Figure 2:
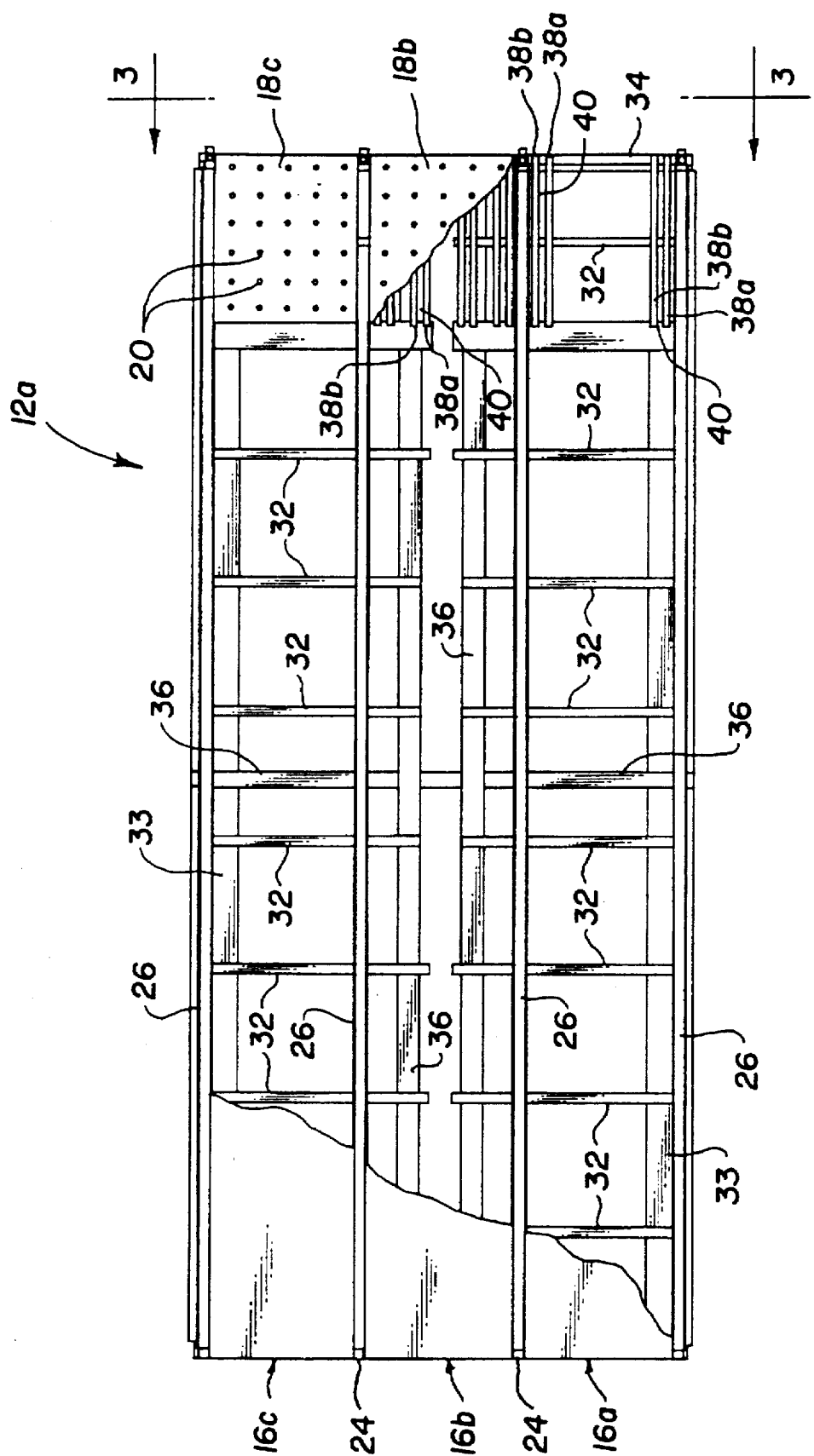
FIG. 2 is plan view, with parts broken away partially in section for clarity, of one of the truss table sections shown in FIG. 1.
Figure 3:
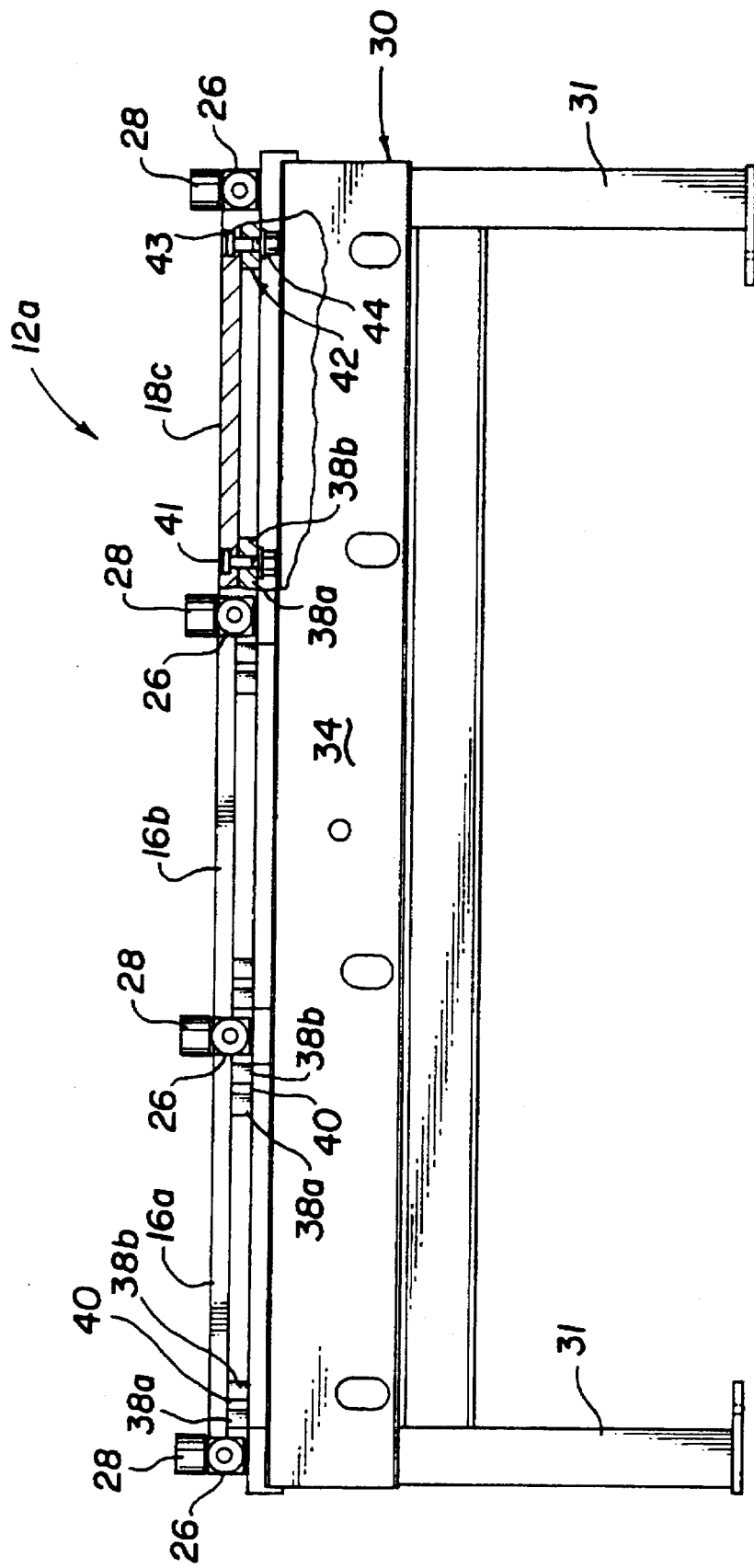
FIG. 3 is a side elevation view of a truss table section taken on lines 3—3 of FIG. 2 looking in the direction of the arrows.

Referring now to FIGS. 2 and 3, the details of an improved table section for a truss assembly apparatus according to the invention will be described, using table section 12a as being representative of any one of the tables 12a–12e of the apparatus 10 shown in FIG. 1. Referring briefly first to FIG. 3 of the drawing, the frame 30 of the table section 12a is shown as having a plurality of legs 31 which can be positioned at the corners of the table section 112a or elsewhere, to provide structural support to the table section 12a. As is shown in FIG. 2, the panels 16a, 16b, and 16c and the several jig stop assemblies 26 are supported from an array of horizontally extending support members 32. In the illustrated embodiment of FIG. 2, the horizontally extending support members 32 are channel shaped, however, it is to be appreciated that they could easily within known engineering principles take on other structural forms. Bounding the periphery of the table section 12a and connecting the legs 31 together is a peripheral frame formed by side members 33 and end members 34. Cross members 36 are also provided as illustrated in FIG. 2 to provide additional structure and rigidity to the frame 30 of table section 12a. As can be seen in FIG. 2, the support members 32 are supported with their upper surfaces defining a horizontally extending plane and are connected by welding or the like to side members 33 and cross members 36. Therefore, the upper surfaces of support members 32 form a planar subfloor on which the panels 16a, 16b, and 16c rest.

Panels 16a, 16b, and 16c are removably secured to the support members 32 of frame 30 by bolts or other suitable fasteners (not shown) so that they can be removed, replaced, or changed as desired. The heads of the bolts or fasteners used to removably attach the panels 16a, 16b, and 16c to the support members 30 are recessed into the upper surface of the panels so they do not interfere with the table work surface provided by the panels.

Figure 6:
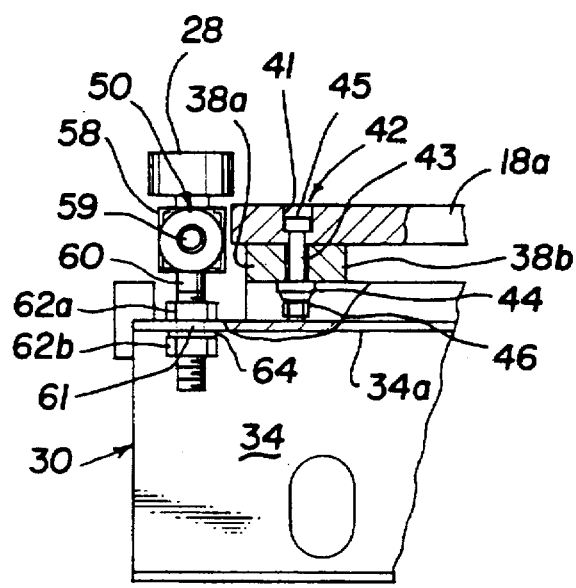
FIG. 6 is an enlarged side elevation view of the positioning mechanism taken along line 6—6 of FIG. 4 looking in the direction of arrows.

According to one aspect of the present invention, a preferred embodiment for the mounting of the plates 18a, 18b, and 18c to the frame 30 of the table section 12a is shown in FIGS. 2 and 3, and in more detail in FIG. 6 showing the attachment of plate 18a as being representative of any one of the plates. Several pairs of spacing bars, each pair identified by the reference numeral 38a and 38b, are located on the frame 30 as shown in FIGS. 2 and 3. These pairs of spacing bars 38a and 38b each form a slot 40 therebetween. The plates 18a, 18b, and 18c are each provided with at least one, but more preferably several, plate bores 41 (which may be the same or different from previously described jig bores 20) through which fastener assemblies 42 extend to adjustably connect the plates to the frame of the table 12a through the slot 40 formed by the pairs of spacing bars 38. The fastener assemblies 42 can be of any suitable design, but according to the presently most preferred embodiment of the invention best shown in FIG. 6, each has a threaded shank portion 43 with a head 45 formed thereon and washer or collar 44 that is of sufficient size to span the slot 40 to mount the plates 18a, 18b, and 18c thereon. The fastener assembly also includes a correspondingly threaded nut 46 for securing the plate to the pair of spacing bars 38a and 38b of the frame 30. As was previously pointed out during setup of the truss assembly apparatus 10, these plates 18a, 18b, and 18c also have an array of jig bores 20 that can be aligned across the length of the entire apparatus 10. By utilizing the pairs of parallel spacing bars 38a and 38b and the fastener assemblies 42, the pates 18a, 18b, and 18c can be set in correct alignment on the table 12a in a simple and efficient manner.

The vertical height of the plates 18a, 18b, and 18c can be selectively adjusted to present a coplanar table top working surface with the panels 16a, 16b, and 16c. According to the presently most preferred embodiment of the invention, the height of the plates can be shimmed with additional washers or spacers on the shank portion 43 adjacent to the collar 44 of the fastener assemblies 42 to selectively adjust the vertical position of the plates.

Figure 4:
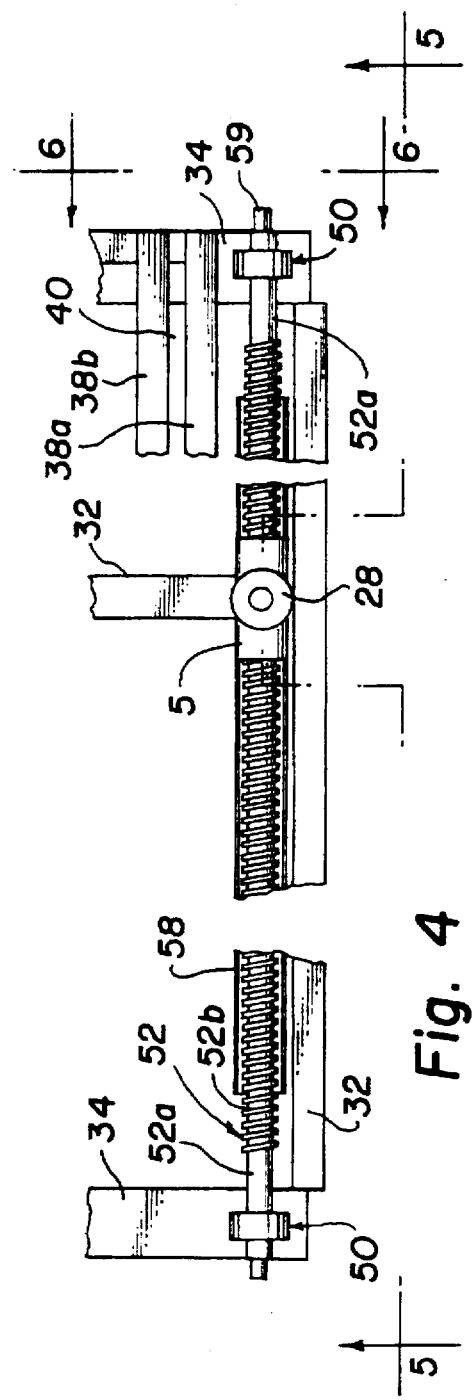
FIG. 4 is an enlarged top plan view of the mechanism for positioning the jig stop assemblies in a truss table, with parts broken away for clarity.
Figure 5:
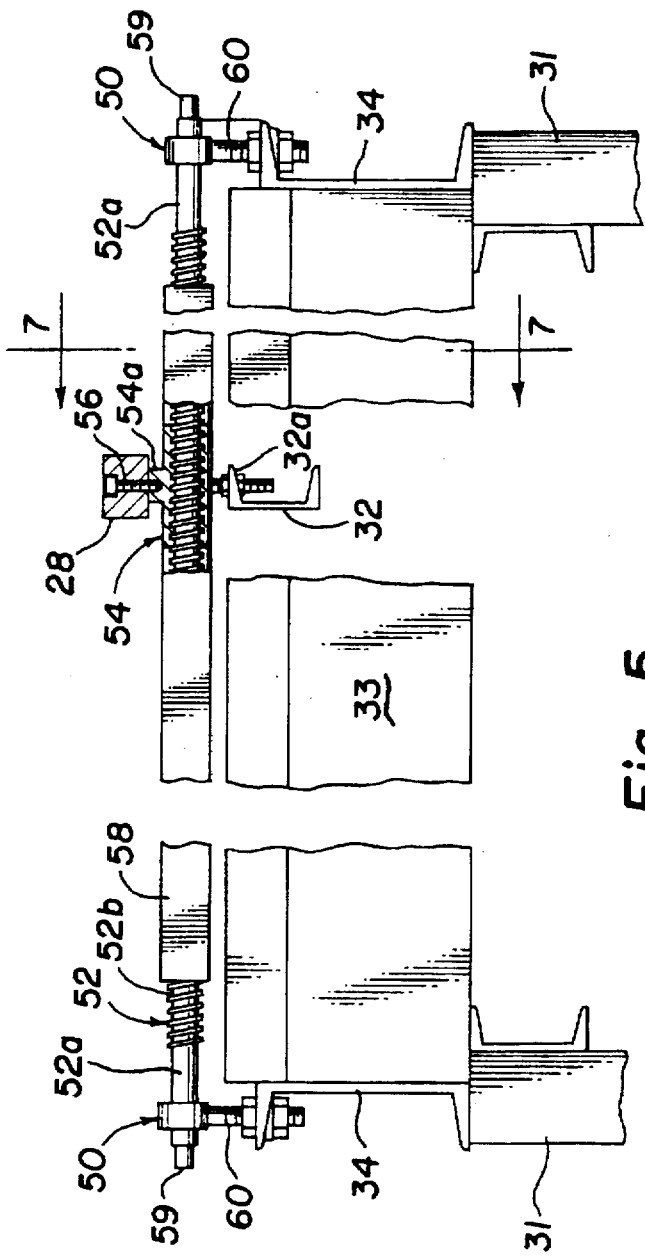
FIG. 5 is a view of the positioning mechanism shown in FIG. 4, partly in side elevation and partly in section, taken along line 5—5 of FIG. 4 looking in the direction of the arrows.

The details of the construction of the jig stop assemblies 26 are similar to those shown in FIGS. 4 and 5 of U.S. Pat. No. 4,943,038 issued Jul. 24, 1990 and assigned to Alpine Engineered Products, Inc., the specification and drawings of which are incorporated herein by reference in the entirety.

According to another aspect of the invention, the vertically adjustable mounting for the jig stop assemblies 26 to the frame 30 is illustrated in FIGS. 4–7. Referring now to the top plan view of FIG. 4, end members 34 rigidly support bearing mountings 50, which are positioned at each end of the jig stop assemblies 26. Each of the bearing mountings 50 contain friction bearings which engage a lead screw 52. The lead screw 52 has shank portions 52a at either end thereof and a threaded portion 52b. At least one jig stop carrier 54 is mounted on each the threaded portion 52b of lead screw 52 to carry a corresponding jig stop 28. As shown in FIG. 5, the jig stop carrier 54 has an upwardly extending cylindrical stub portion 54a. The stub portion 54a has a screw-threaded opening that receives a bolt 56 for removably attaching a jig stop 28 to the carrier 54. Each carrier 54 is slidably received within a slotted guide tubing 58 which forms a guide channel for the carrier 54. Each lead screw 52 has a stub 59 from the ends thereof for engagement by a socket wrench, which if desired can be operably connected to be driven by a hand powered drill (not shown). In addition, the lead screw 52 maybe driven by a power apparatus such as shown in U.S. Pat. No. 4,943,038.

As will be appreciated with this arrangement, as each lead screw 52 is rotated it in turn moves the corresponding jig stop 28 alongside a panel 16a, 16b, or 16c to any selected position between the front and back of the table section 12a.

As is shown in detail in FIG. 6, each bearing mounting 50 has a threaded shank 60 fixed thereto. The shank 60 extends through a corresponding aperture 61 located on a suitable portion of the frame 30. In the presently most preferred embodiment of the invention, a pair of threaded nuts 62a and 62b and a washer 64 are used to selectively mount the bearing mounting 510 through an aperture of a flange 34a on one of the end members 34. Thus, as can be appreciated from the drawing, the lead screw 52 can be selectively mounted and positioned at various heights to accommodate various thickness of panels 16a, 16b, and 16c.

Figure 7:
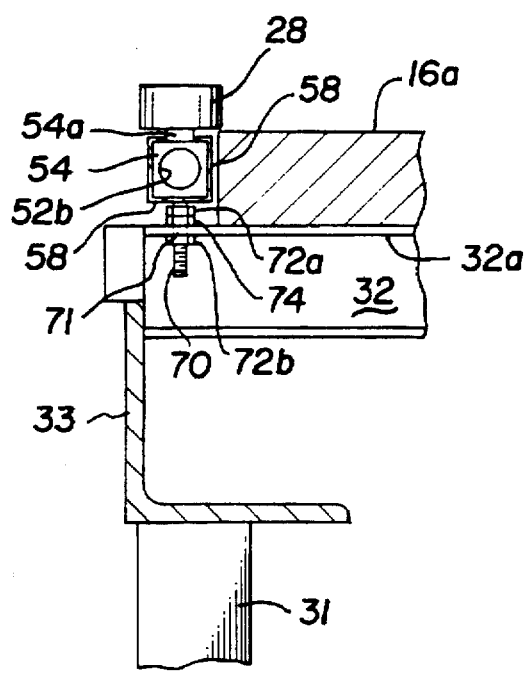
FIG. 7 is a sectional view taken along line 7—7 of FIG. 5 looking in the direction of the arrows.

In the most preferred embodiment of the invention, the guide tubing 58 is mounted to the frame in a similar manner. Referring now to FIG. 7, the guide tubing 58 is supported from a support member 32. A shank 70 extends through a corresponding aperture 71 located on a suitable portion of the frame 30. In the presently most preferred embodiment of the invention, a pair of threaded nuts 72a and 72b and a washer 74 are used to selectively mount the guide tubing 58 through an aperture of a flange 32a on one of the support members 32. Thus, as can be appreciated from the drawing, the guide tubing 58 can also be selectively mounted and positioned at various heights to accommodate various thickness of panels 16a, 16b, and 16c and to cooperate with the selected height for the lead screw 52.

Figure 8:
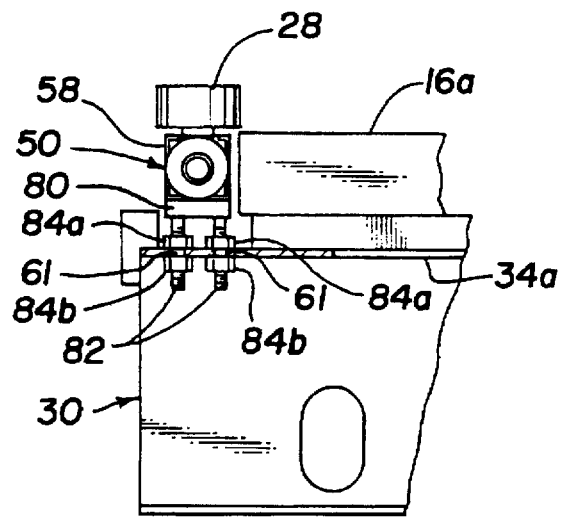
FIG. 8 is a section view of an alternative embodiment of the positioning mechanism taken along line 6—6 of FIG. 4 looking in the direction of the arrows.

Referring now to FIG. 8 of the drawing, an alternative embodiment for vertically adjusting the position of each bearing mounting 50 is shown. In the alternative embodiment, the bearing mounting 50 has body portion 80. The body portion has at least one, but preferably two threaded apertures adapted for receiving the corresponding threaded shank 82. (In yet another alternative, the threaded shank 82 can be integrally formed on the bearing mounting 50.) The threaded shank 82 is positioned to extend through an aperture 61 located on a suitable portion of the frame 30. In this embodiment, each threaded shank 82 is the invention, a pair of threaded nuts 84a and 84b are used to selectively mount the guide tubing 58 through an aperture of a flange 34a on one of the end members 34. If desired, a washer (such as washer 64 shown in FIG. 6) can also be used to help secure and position the shank 82 to the frame 30. Thus, as can be appreciated from the drawing, the lead screw 52 can be selectively mounted and positioned at various heights to accommodate various thickness of panels 16a, 16b, and 16c.

The embodiments shown and described above are only exemplary. Many details are often found in the art such as the truss assembly apparatus described in U.S. Pat. No. 4,943,038 and are used which are currently on the market and available to those in the trade. Therefore, many such details are neither shown nor described. Thus, it is not claimed that all of the details, parts, elements, or steps described and shown are invented herein. Even though numerous characteristics and advantages of the present inventions have been set forth in the foregoing description, together with the details of the structure and function of the invention, the disclosure is illustrative only, and changes may be made in the detail, especially in the matters of shape, size, and arrangement of parts within the principles of the invention to the full extent indicated by the broad and general meaning of the terms used in the attached claims.

The restrictive description and drawings of the specific examples above do not point out what an infringement of this patent would be, but are to provide at least one explanation of how to make and use the inventions. The limit of the inventions and the bounds of the patent protection are measured by and defined in the following claims.

Having described the invention, what is claimed is:

1. A table for use in a truss assembly apparatus, the table comprising:

a frame;

a plurality of panels defining a work surface, the plurality of panels supported by the frame and separated by at least one opening extending across the table;

mountings for rotationally mounting a lead screw across the table along the opening between the panels;

at least one jig stop carrier threadedly coupled to the lead screw and movable along the lead screw in the opening between the panels across the table in response to rotation of the lead screw;

a jig stop connected to the jig stop carrier and projecting above the work surface of the table;

at least one threaded shank connected to each of the mountings, the threaded shank extending through an aperture in the frame to selectively mount the mountings on the frame; and at least one threaded fastener on the threaded shank for securing the threaded shank to the frame at a selected position along the shank, whereby the mountings are releasably secured at a selected height so that the jig stops are operably associated with the work surface defined by the panels.

2. A table according to claim 1 further comprising: a guide channel extending across the table along one of the openings between the panels, wherein the lead screw and the jig stop carrier are positioned within the guide channel whereby the guide channel guides the carrier as the lead screw is rotated to selectively adjust the position of the carrier and the jig stop along the opening between the panels.

3. A table according to claim 1 wherein the frame includes parallel spaced members, and at least one of the panels is removably connected to the parallel spaced members of the frame whereby the panels can be adjustably located on the frame.

4. A table according to claim 1 wherein the lead screws have end stub projections thereon for selective engagement to a rotational power source.

5. A truss assembly table comprising:

a frame;

a plurality of removable table panels on the frame in succession along the table forming a work surface with each panel separated by openings extending across the table;

at least one jig stop located at one of the openings and projecting above the top of the table panels;

a track assembly for selectively positioning the jig stops along a path at the openings; and adjustable means mounting the track assembly on the frame whereby the path of the jig stops can be adjusted vertically relative to the work surface.

6. A truss assembly table according to claim 5, wherein the adjustable means for mounting the track assembly comprises:

at least one threaded shank fixed on the track assembly, the threaded shank extending through an aperture in the frame to selectively mount the track assembly on the frame; and threaded fasteners on the threaded shank for securing the threaded shank to the frame at a selected position along the shank, whereby the track assembly is releasably secured at a selected height so that the jig stops are operably associated with the work surface defined by the panels.

7. A truss assembly table comprising:

a frame;

a plurality of removable table panels on the frame in succession along the table forming a work surface;

a plurality of removable end plates, each end plate corresponding to one end of one of the removable table panels and shaped to abut the one end of the removable table panels, each plate having a plurality of jig bores therein for removably attaching jig stops and each plate having at least one plate bore therein for removably attaching the plate to the frame;

a plurality of pairs of spacing structures rigidly attached to the frame, each pair of spacing structures defining a slot therebetween; and a plurality of fasteners for removably attaching and positioning the end plates on the pairs of spacing structures, whereby the position of the end plates can be independently adjusted on the frame.

8. A truss assembly table according to claim 7, wherein each of the fasteners further comprises:

a threaded shank portion having a head portion;

a collar that is of sufficient size to span the slot defined by one of the pairs of spacing structures; and a threaded nut for securing the shank portion to the spacing members on the frame.

9. A truss assembly table according to claim 8, wherein each of the fasteners additionally comprises at least one washer, whereby the vertical height of the plates can be selectively adjusted to present a planar table top working surface.

10. A truss assembly table according to claim 7, wherein each panel is separated by openings extending across the table and further comprising:

at least one jig stop located at one of the openings and projecting above the top of the table panels;

a track assembly for selectively positioning the jig stops along a path at the openings; and adjustable means mounting the track assembly on the frame whereby the path of the jig stops can be adjusted vertically relative to the work surface.

11. A truss assembly table according to claim 10, wherein the adjustable means for mounting the track assembly comprises:

at least one threaded shank fixed on the track assembly, the threaded shank extending through an aperture in the frame to selectively mount the track assembly on the frame; and at least one threaded fastener on the threaded shank for securing the threaded shank to the frame at a selected position along the shank, whereby the track assembly is releasably secured at a selected height so that the jig stops are operably associated with the work surface defined by the panels.

* * * * *

UNITED STATES PATENT AND TRADEMARK OFFICE
CERTIFICATE OF CORRECTION

PATENT NO. : 5,676,358

DATED : October 14, 1997

INVENTOR(S) : Wayne A. Shamblin and Michael C. Rosser

It is certified that errors appear in the above-identified patent and that said Letters Patent is hereby corrected as shown below:

In Column 1, line 27, change "Engineering" to -- Engineered --;

In Column 2, line 29, change ":bore" to -- bore --;

In Column 3, line 63, delete "each of";

In Column 3, line 65, change "are" to -- is --;

In Column 4, line 49, change "112a" to -- 12a --;

In Column 5, line 52, change "the" to -- their --;

In Column 6, line 18, change "510" to --50 --;

In Column 6, line 36, change "ness" to -- nesses --;

In Column 6, line 48, change "is" to -- has --;

In Column 6, line 48, delete "the invention,";

In Column 6, line 49, after "84b" add -- that --;

in Column 6, line 56, change "thickness" to -- thicknesses --;

Signed and Sealed this

Third Day of March, 1998

*Attest:*

*Attesting Officer*

BRUCE LEHMAN

*Commissioner of Patents and Trademarks*